US009069899B2

(12) United States Patent
Bragdon et al.

(10) Patent No.: US 9,069,899 B2
(45) Date of Patent: Jun. 30, 2015

(54) INTEGRATING DIAGNOSTIC INFORMATION IN DEVELOPMENT ENVIRONMENT

(75) Inventors: Andrew C. Bragdon, Redmond, WA (US); Gareth Jones, Issaquah, WA (US); Mark A. Groves, Monroe, WA (US); Tracey Glass Trewin, Fall City, WA (US)

(73) Assignee: MICROSOFT TECHNOLOGY LICENSING, LLC

( * ) Notice: Subject to any disclaimer, the term of this patent is extended or adjusted under 35 U.S.C. 154(b) by 156 days.

(21) Appl. No.: 13/533,997

(22) Filed: Jun. 27, 2012

(65) Prior Publication Data

US 2014/0007049 A1 Jan. 2, 2014

(51) Int. Cl.
| G06F 15/177 | (2006.01) |
| G06F 17/00 | (2006.01) |
| G06F 17/24 | (2006.01) |
| G06F 3/048 | (2013.01) |
| G06F 9/44 | (2006.01) |
| G06F 9/45 | (2006.01) |
| G06F 9/46 | (2006.01) |
| G06F 3/00 | (2006.01) |
| G06F 11/36 | (2006.01) |

(52) U.S. Cl.
CPC .................................. *G06F 11/3664* (2013.01)

(58) Field of Classification Search
CPC .............. G06F 8/00; G06F 8/71; G06F 8/30; G06F 8/447; G06F 9/4443; G06F 9/44505; G06F 9/4446
See application file for complete search history.

(56) References Cited

U.S. PATENT DOCUMENTS

| 4,809,170 | A | * | 2/1989 | Leblang et al. ................ 717/122 |
| 5,748,878 | A | * | 5/1998 | Rees et al. ..................... 717/130 |
| 5,802,371 | A | * | 9/1998 | Meier ............................ 717/133 |
| 6,226,787 | B1 | | 5/2001 | Serra et al. |
| 6,799,718 | B2 | * | 10/2004 | Chan et al. .................... 717/136 |
| 6,993,710 | B1 | * | 1/2006 | Coad et al. .................... 715/202 |

(Continued)

FOREIGN PATENT DOCUMENTS

| WO | 2001016754 A1 | 3/2001 |
| WO | 2006113111 A2 | 10/2006 |

OTHER PUBLICATIONS

"NDepend—Analysis Report", Retrieved at <<http://www.codeproject.com/Articles/323193/NDepend-Analysis-Report>>, Feb. 1, 2012, pp. 1-3.

(Continued)

*Primary Examiner* — Don Wong
*Assistant Examiner* — Anibal Rivera
(74) *Attorney, Agent, or Firm* — Kevin Sullivan; Kate Drakos; Micky Minhas (57) ABSTRACT

Aspects of the subject matter described herein relate to assisting software development. In aspects, a software development environment may display code and information about the code on a user interface. In one example, the information includes diagnostic information about the code. The information may be represented by actionable tags that allow the software developer to drill-down and obtain more detailed information about the code. The information may be automatically obtained by the software development environment in a way that does not interfere with the development activities of the software developer. The actionable tags are displayed in close proximity to code with which they are associated.

20 Claims, 8 Drawing Sheets

(56) References Cited

U.S. PATENT DOCUMENTS

| | | | |
|---|---|---|---|
| 6,993,759 B2* | 1/2006 | Aptus et al. ............... | 717/170 |
| 7,146,355 B2 | 12/2006 | Chu-Carroll | |
| 7,703,076 B1 | 4/2010 | Kocot | |
| 7,814,467 B2 | 10/2010 | Li et al. | |
| 8,032,863 B2 | 10/2011 | Kolawa et al. | |
| 8,495,600 B2* | 7/2013 | Naccache et al. ............ | 717/144 |
| 2003/0159133 A1 | 8/2003 | Ferri et al. | |
| 2005/0021689 A1* | 1/2005 | Marvin et al. ............... | 709/220 |
| 2005/0262484 A1* | 11/2005 | Glerum et al. ............... | 717/130 |
| 2006/0200834 A1* | 9/2006 | Cukierman et al. ........... | 719/328 |
| 2007/0240101 A1* | 10/2007 | Wilson ........................ | 717/104 |
| 2007/0250810 A1* | 10/2007 | Tittizer et al. ............... | 717/110 |
| 2007/0283321 A1* | 12/2007 | Hegde et al. ................. | 717/110 |
| 2008/0189681 A1* | 8/2008 | Bhogal et al. ................ | 717/106 |
| 2008/0228762 A1* | 9/2008 | Tittizer et al. ............... | 707/5 |
| 2009/0037830 A1* | 2/2009 | Kulkarni et al. ............. | 715/764 |
| 2009/0094580 A1* | 4/2009 | Bank et al. ................... | 717/123 |
| 2009/0094581 A1 | 4/2009 | Bates et al. | |
| 2009/0138843 A1* | 5/2009 | Hinton et al. ................ | 717/101 |
| 2010/0058291 A1* | 3/2010 | Hahn et al. ................... | 717/113 |
| 2010/0100871 A1 | 4/2010 | Celeskey et al. | |
| 2010/0211924 A1* | 8/2010 | Begel et al. .................. | 717/101 |
| 2010/0318959 A1* | 12/2010 | Rowan et al. ................ | 717/105 |
| 2011/0055799 A1* | 3/2011 | Kaulgud et al. .............. | 717/101 |
| 2011/0099549 A1* | 4/2011 | Sriraghavan et al. ......... | 718/100 |
| 2011/0314450 A1* | 12/2011 | Shochat et al. .............. | 717/124 |
| 2012/0089964 A1* | 4/2012 | Sawano ...................... | 717/124 |
| 2013/0117725 A1* | 5/2013 | Bnayahu et al. ............. | 717/101 |

OTHER PUBLICATIONS

"Coverity Static Analysis", Retrieved at <<http://coverity.com/products/static-analysis.html>>, Retrieved Date: Apr. 12, 2012, pp. 1-3.

Biehl, et al., "FASTDash: A Visual Dashboard for Fostering Awareness in Software Teams", Retrieved at <<http://research.microsoft.com/en-us/um/redmond/groups/cue/publications/chi2007-fastdash.pdf>>, Proceedings of the SIGCHI conference on Human factors in computing systems, Apr. 28, 2007, pp. 1313-1322.

D'Souza, et al., "Tool Evaluation Report: Fortify", Retrieved at <<http://www.cs.cmu.edu/~aldrich/courses/654/tools/dsouza-fortify-07.pdf>>, Apr. 24, 2007, pp. 1-10.

PCT International Search Report and Written Opinion for Application No. PCT/US2013/046673, European Patent Office, P.B. 5818 Patentlaan 2, NL-2280 HV Rijswijk, Mailed: Oct. 16, 2013, 10 pages.

* cited by examiner

```
┌─────────────────────────────────────────────────────────────────────┐
│ FILE EDIT VIEW ....  305                                         ⊠ │
├─────────────────────────────────────────────────────────────────────┤
│ 315                                                                 │
│                                                                     │
│ T1  // uses|4 meta-uses|1 test|0 mutations|480ms up 25ms (p<0.05) ←─320
│ T2  public void AddCartItemsToOrder(ShoppingCart cart) {            │
│       foreach (ShoppingCartItem item in cart.Items) {               │
│         AddLineItem(item);                                          │
│       }                                                             │
│     }                                                               │
│                                                                     │
│ T3  4 uses|33 meta-uses|8 tests 9 mutations 30ms ←─325              │
│ T4  public void AddLineItem(ShoppingCartItem cartItem) {            │
│       if (cartItem.Product == null)                                 │
│         throw new InvalidOperationException(Messages.NullCartItemProduct);
│                                                                     │
│ T5    Product item = cartItem.Product;                              │
│                                                                     │
│ T6    if (CurrentState.CanChangeItems) {                            │
│ T7      OrderLine lineItem = new OrderLine(cartItem.DateAdded, cartItem.Quantity.item);
│       }                                                             │
│     }                                                               │
└─────────────────────────────────────────────────────────────────────┘
                              300
```

| FILE EDIT VIEW ... | 305 |
|---|---|

310

405
```
4 uses|3 co-changes 30ms
void AddLineItem(...) {
...
}
```

410
```
3 co-changes for AddLineItem

SimpleOrderRepository (4 co-changes)
Public Order(int orderStatusID) {
    SetOrderStatus(orderStatusID);
}

SimpleOrderRepository (2 co-changes)
void ValidateCustomer(Customer customer) {
    if (this.ID != null)
        this.DateCreated = DateTime.Now;
}

SimpleOrderRepository (1 co-change)
void AddCartItemsToOrder(ShoppingCart cart) {
    foreach (ShoppingCartItem item in cart.Items) {
        AddLineItem(item);
    }
}
```

```
FILE EDIT VIEW ...   305
─────────────────────────────────────────────────────────
310

515
6 uses|3 authors 60ms
void RemoveItem(...) {
   ...
}

520
3 authors for RemoveItem

Kevin B. (4 changes + original)
void RemoveItem(string sku) {
   if (CurrentState.CanChangeItems) {
      for (int i = 0; i < this.Items.Count; i++) {
         if (this.Items[i].Item.SKU.Equals(sku))
            this.Items.RemoveAt(i);
      }
   }
}

Gareth J. (1 change)
void RemoveItem(string sku) {
   if (CurrentState) {
      for (int i = 0; i < this.Items.Count; i++) {
         if (this.Items[i].Item.SKU.Equals(sku))
            this.Items.RemoveAt(i);
      }
   }
}

Ryan T. (1 change)
void RemoveItem(string sku) {
   if (CurrentState.CanChangeItems) {
      for (int i = 0; i < this.Items.Count; i++) {
         if (this.Items[i].Item.SKU.Equals(sku))
            this.Items.RemoveAt(i);
      }
   }
}
```

```
FILE EDIT VIEW ...  305

310  715

37 uses|481 meta-uses|2 tests (passing)
void ResetUI(...) {
...
}

720

2 Tests found for ResetUI()

ProductRegressionTests
[TestMethod]
void Test1()
{
    ShoppingCart cart = new ShoppingCart("TEST");
    Cart.AddItem(new Product("SKU"));
    Assert.AreEqual(1, cart.TotalItems);
}

FrontendTests
[TestMethod]
void Test2()
{
    ShoppingCart cart = new ShoppingCart("TEST");
    cart.AddItem(new Product("SKU1"));
    cart.AddItem(new Product("SKU2"));
    Assert.AreEqual(2, cart.TotalItems);
}
```

INTEGRATING DIAGNOSTIC INFORMATION IN DEVELOPMENT ENVIRONMENT

BACKGROUND

There are many tools available to analyze software. Each tool may measure one or more characteristics of the software. Using these tools, obtaining information from the tools, and putting the information to use in improving the software is often a complex and time consuming process.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to assisting software development. In aspects, a software development environment may display code and information about the code on a user interface. In one example, the information includes diagnostic information about the code. The information may be represented by actionable tags that allow the software developer to drill-down and obtain more detailed information about the code. The information may be automatically obtained by the software development environment in a way that does not interfere with the development activities of the software developer. The actionable tags are displayed in close proximity to code with which they are associated.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

The term "function" as used herein may be thought of as a portion of code that performs one or more tasks. Although a function may include a block of code that returns data, it is not limited to blocks of code that return data. A function may also perform a specific task without returning any data. Furthermore, a function may or may not have input parameters. A function may include a subroutine, a subprogram, a procedure, method, routine, or the like. Thus, where the term function is used, in alternative embodiments, the word function is to be replaced by each of the terms above.

Computer storage media as used herein includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer. Computer storage media does not include communication media.

Headings are for convenience only; information on a given topic may be found outside the section whose heading indicates that topic.

Other definitions, explicit and implicit, may be included below.

Exemplary Embodiments

Figure 1:
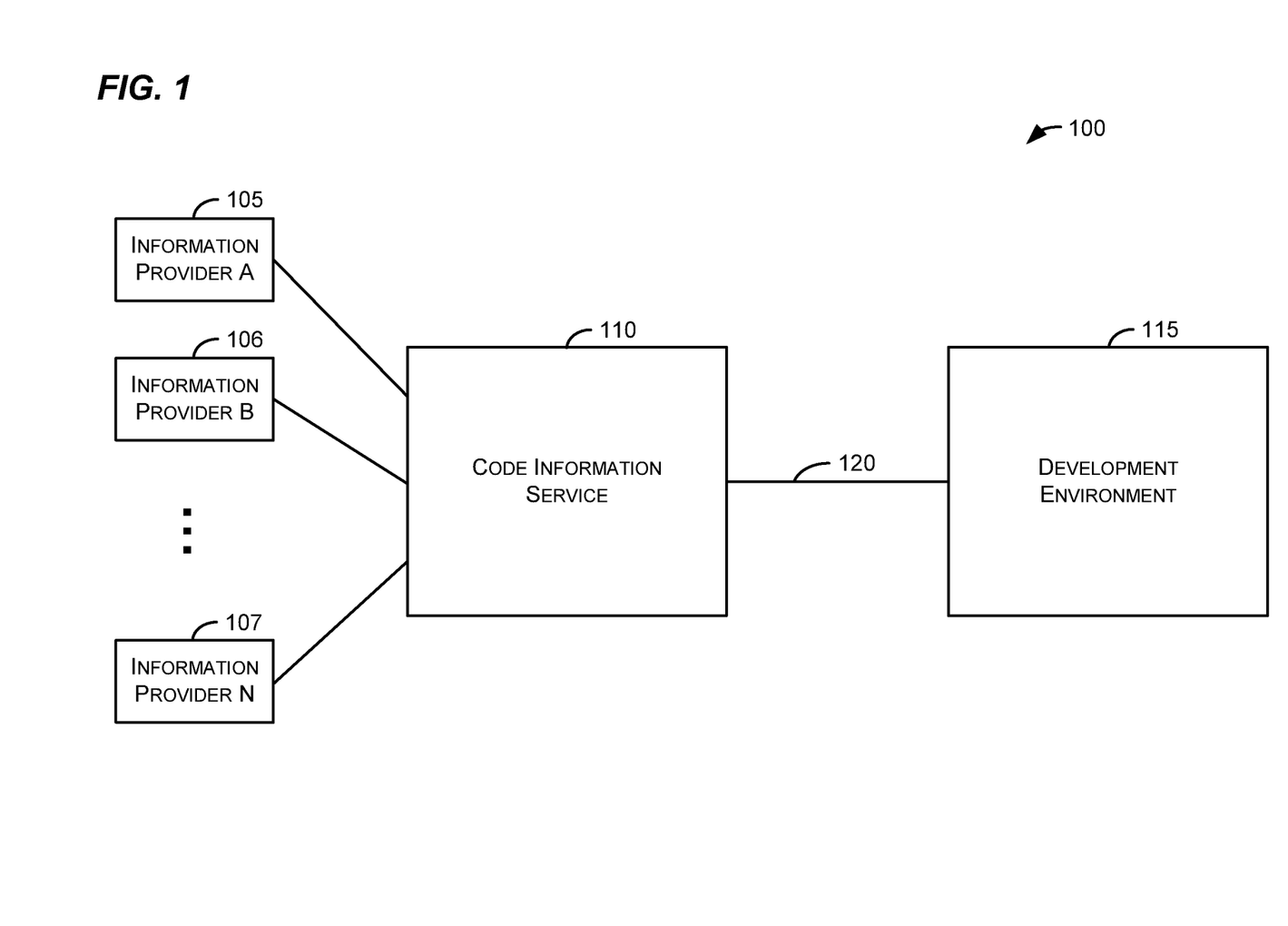
FIGS. 1-2 are block diagrams that represent exemplary environments in which aspects of the subject matter described herein may operate.
Figure 2:
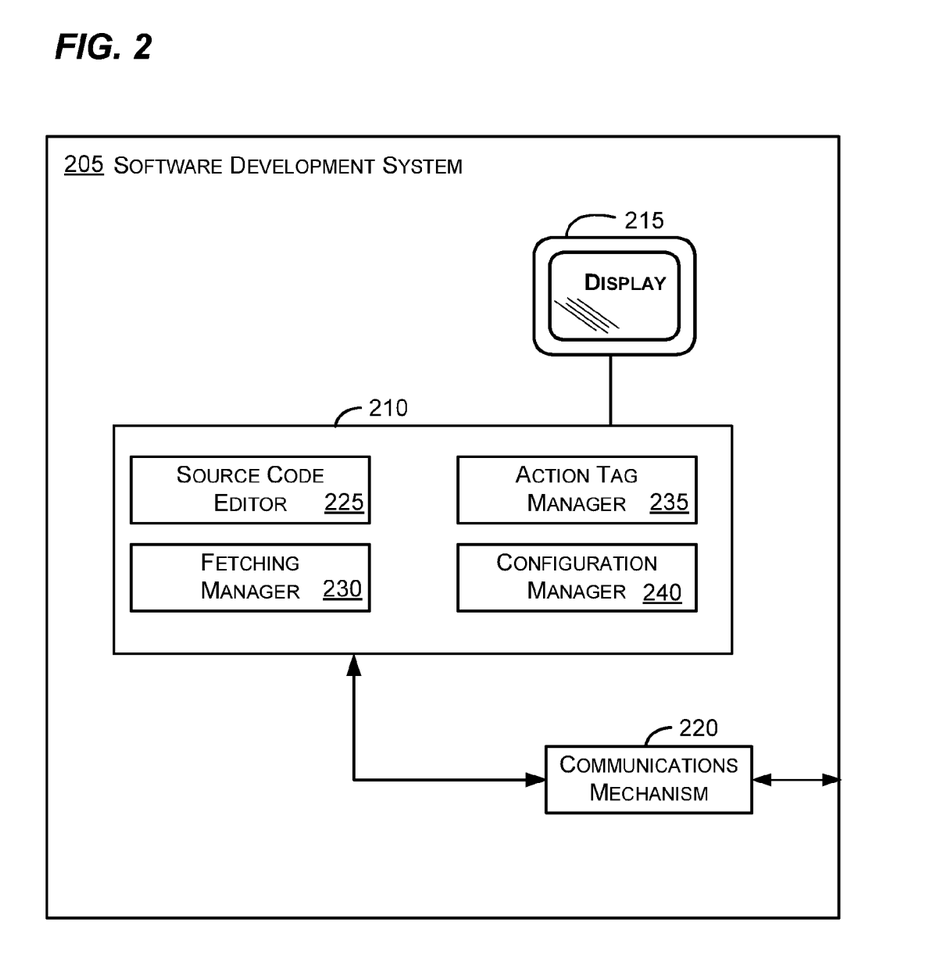

FIGS. 1-2 are block diagrams that represent exemplary environments in which aspects of the subject matter described herein may operate. The components illustrated in FIGS. 1-2 are exemplary and are not meant to be all-inclusive of components that may be needed or included. In other embodiments, the components and/or functions described in conjunction with FIG. 1-2 may be included in other components (shown or not shown) or placed in subcomponents without departing from the spirit or scope of aspects of the subject matter described herein. In some embodiments, one or more of the components described in conjunction with FIG. 1-2 may be distributed across multiple devices that may be located closely together (e.g., on a local network) or spread apart (e.g., in different places on the Internet).

Aspects of the subject matter described herein may be implemented with general purpose or special purpose computing system environments or configurations. Examples of computers that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

One or more of the components described herein may operate in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

Turning to FIG. 1, the system 100 may include information providers 105-107, a code information service 110, a development environment 115, and may include other components (not shown). As used herein, the term component is to be read to include all or a portion of one or more devices, a collection of one or more software modules or portions thereof, some combination of one or more software modules or portions thereof and one or more devices or portions thereof, and the like.

The line 120 represents a communication link between the code information service 110 and the development environment 115. The line 120 indicates that the code information service 110 and the development environment 115 may be connected (e.g., logically, physically, virtual, or otherwise) via any type of network or other communication path including shared memory, a direct connection, a local network, a non-local network, the Internet, some combination of the above, and the like. For example, the line 120 may include one or more local area networks, wide area networks, direct connections, virtual connections, private networks, virtual private networks, an intra- or inter-process communication channel, some combination of the above, and the like.

The code information service 110 is a service that provides information about code to the development environment 115. A service may include one or more processes, threads, components, libraries, and the like that perform a designated task. A service may be implemented in hardware, software, or a combination of hardware and software. A service may be distributed over multiple devices or may be implemented on a single device.

The code information service 110 may be hosted on the same computer that hosts the development environment 115, on a computer other than the computer that hosts the development environment 115, or have components that reside both locally and remotely.

In one implementation, the code information service 110 may be hosted in the cloud. The cloud is a term that is often used as a metaphor for the Internet. It draws on the idea that computation, software, data access, storage, and other resources may be provided by entities connected to the Internet without requiring users to know the location or other details about the computing infrastructure that delivers those resources.

The code information service 110 may store information that relates to different snapshots of code. A snapshot of information includes information about the code as it existed at a particular point of time. This may be used, for example, to compare characteristics between different snapshots. For example, the code information service 110 may store performance data that indicates how well sections of the code performed from snapshot to snapshot. The term cube is sometimes used herein to refer to the data stored in one or more snapshots.

The information providers 105-107 are sources of information for the code information service 110. In one embodiment, one or more of the information providers 105-107 are located remotely (e.g., on another computer) from the code information service 110. In another embodiment, one or more of the information providers 105-107 may be hosted on the same computer as the code information service 110.

The information providers 105-107 may analyze code statically (e.g., without executing the code), dynamically (e.g., in conjunction with executing the code), or through a combination of static and dynamic analysis. For example, an information provider may analyze code to determine all functions that make a call to a particular class. As another example, an information provider may obtain the results of attempting to build the code into a coherent system and may extract information from the results that may be provided to the code information service 110. As yet another example, an information provider may obtain the results of running a suite of automated tests.

The information providers 105-107 may collect/generate information at a variety of times. For example, some information may be obtained as changes occur in the code. Other information may be obtained periodically or over a time interval. Yet other information may be obtained through indirect processing of the code (e.g., during building the code into a coherent system). This manner of collecting/generating information may be asynchronous from software development activities.

The information collected by an information provider may be organized by method, class, file, library, directory, a combination of two or more of the above, or the like.

In one implementation, the code information service 110 may provide information about code to the development environment 115 in manner asynchronous to developer actions within the developer environment 115. Asynchronous in this context means that the actions taken by the code information service 110 in interacting with the development environment 115 do not interfere with what the developer is doing.

For example, when a developer scrolls to a section of code within a user interface, the development environment 115 may request information about the section of code from the code information service 110. In response, the code information service 110 may retrieve the information and/or request that the information be generated by one or more of the information providers 105-107. After the information is available on the code information service 110, the code information service 110 may provide the information to the development environment 115. While this is happening, the developer may be viewing, editing, or debugging code or may even scroll to another section of the code. The developer is not required to wait until the code information service 110 has provided the information.

In one implementation, updated information may also be provided from the code information service 110 to the development environment 115 as the information is updated. For example, information that indicates whether unit tests are passing for the displayed code may be sent from the code information service 110 to the development environment 115. In one embodiment, the types of updated information that may be provided may be configurable (e.g., via user interface or otherwise). Updated information may be provided automatically and/or in response to a user activating a refresh user interface element.

In one implementation, when a software developer opens a code file or other scope, the code information service 110 may provide data corresponding to actionable tags for the scope. The development environment 115 may then use this data to display the actionable tags together with the code in a graphical interface as illustrated in FIG. 3.

Figure 3:
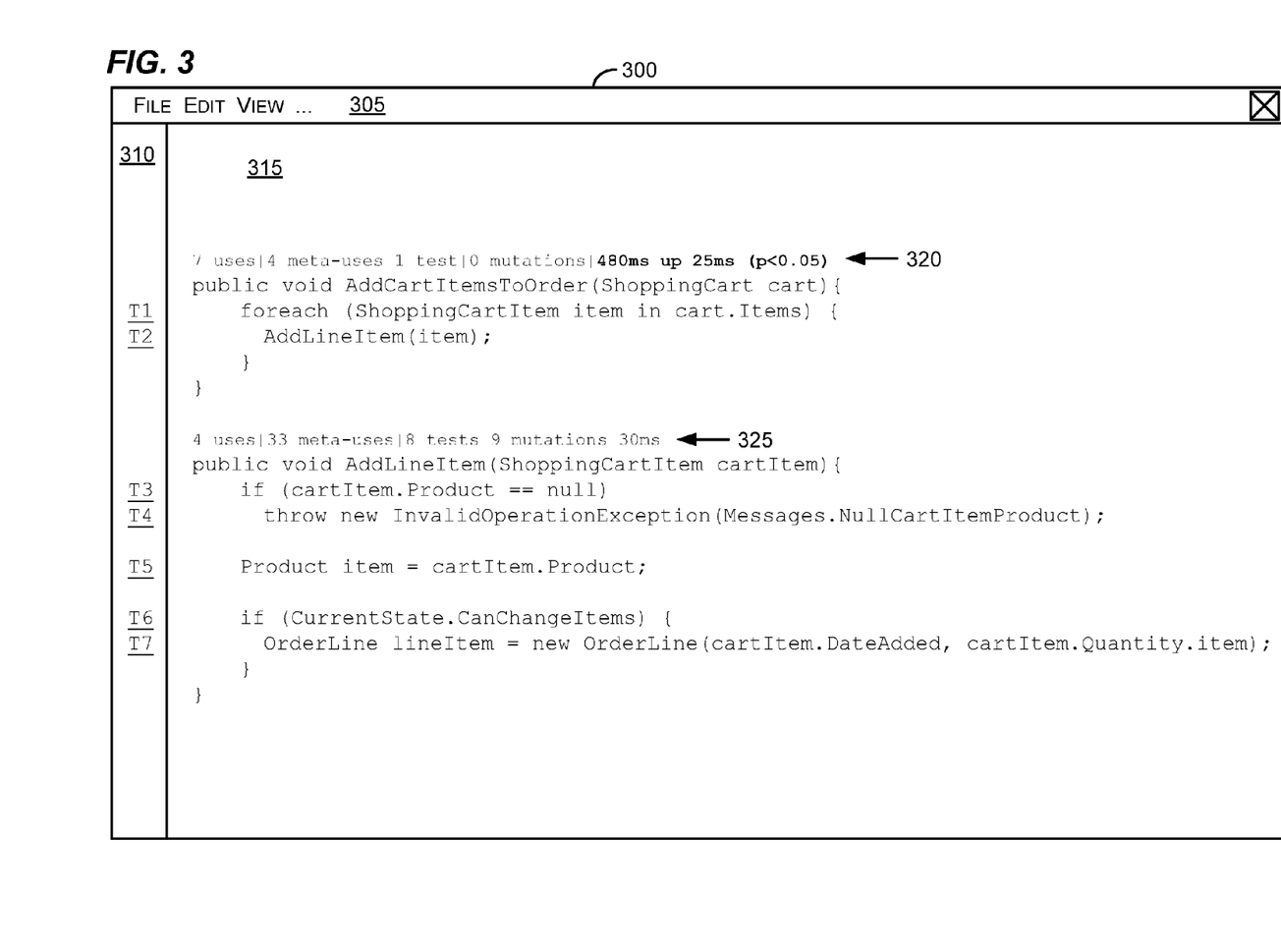
FIG. 3 is a block diagram of an exemplary user interface window in accordance with aspects of the subject matter described herein.

FIG. 3 is a block diagram of an exemplary user interface window in accordance with aspects of the subject matter described herein. In one example, the window 300 may include a menu 305, a margin 310, and a pane 315, which are each elements of the user interface.

In general, an element (sometimes called a control) may be composed of zero or more other elements. For example, an element may include zero or more other elements which may include zero or more other elements and so forth. Furthermore, it will be recognized, that the window 300 may have more, fewer, or other elements which may be arranged in a variety of ways without departing from the spirit or scope of the subject matter described herein.

As shown in FIG. 3, the menu 305 may include menu items such a file, edit, view, and other menu items as desired. Selecting a menu item may cause a submenu to appear which provides additional menu items to select from. Menu items in a submenu may cause additional submenus to appear and so forth.

The margin 310 may include one or more actionable tags (e.g., T1-T7). Each tag in the margin may be adjacent to a line of code that is displayed in the pane 315. A tag may indicate various information about a line of code such as the number of direct uses of a variable within a function, the number of functions that use a function, an average number of times that a for loop repeats as well as a variation within a certain confidence, how often a conditional statement evaluates as true, whether a branch in a conditional statement is ever reached, whether an exception is caught or not caught in the function, other information, and the like.

In an area including in the pane 315, the pane 315 may display code and one or more actionable tags (e.g., the tags 320, and the tags 325). As illustrated, the tags are separated by vertical bars (e.g., by a "|"), but in other implementations, other separators may be used. As illustrated, the actionable tags are placed above the functions with which they are associated, but in other implementations, the actionable tags may be placed in other locations.

In some implementations, there may be an actionable tags associated with enumerations, variables of classes, classes, namespaces, or other scopes.

The actionable tags 320 include a tag that indicates that execution time has increased 25 ms. This tag is highlighted by bolding, but in other implementations may be highlighted by underlining, a different color, larger text, or the like.

If the development environment does not recognize the contents of a file as fitting some programming or other structured language syntax, tags appropriate to the text of the file may be displayed. For example, tags representing modifications, if any, to the file may be displayed.

Actionable tags may allow a software developer to "drill down" to obtain more detail. For example, in response to detecting a hovering action over an actionable tag, the development environment 115 may display more detail about the actionable tag. As another example, in response to detecting a mouse click of an actionable tag, the development environment 115 may display a greater level of detail about the actionable tag.

Other forms of input, including a Natural User Interface (NUI) may also be used to interact with tags. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

Returning to FIG. 1, the information provided by the code information service 110 may include any data that may be useful to a person who is developing or otherwise interacting with the code. For example, the information may include static information, dynamic information, change history, code analytics, and the like.

Below, some examples of each of the types of information above are described. The examples below are not intended to be all-inclusive or exhaustive. Indeed, based on the teachings herein, those skilled in the art may recognize other examples that fall within the spirit and scope of aspects of the subject matter described herein.

Static information may include, for example:

1. Calls. This data may include how many functions include a statement to call a function that is displayed on a graphical interface.

2. Meta-calls. This data may include information that indicates how many functions include a statement to call the functions that in turn include a statement to call a function that is displayed on the user interface. Meta-calls data may be extended to any level. For example, meta-calls data may include information that indicates how many functions call functions that call functions that call functions that call a function that is displayed on the user interface.

3. Overrides. If a method is capable of being overridden, this data indicates how many times the method actually has been overridden.

4. Interfaces. If a method implements all or a portion of an interface, this data may indicate how many implementations of the interface there are. This data may also indicate the number of interfaces with which a method is involved. For example, a method may be used to implement all or a portion of any number of interfaces.

5. Complexity. Various algorithms may be used to determine code complexity. This data may include a value that indicates how complex code is.

6. Bugs filed. This data may indicate how many bug reports have been filed against a method.

7. Code analysis suggestions. A code analyzer may analyze code to determine suggestions to provide. For example, a code analyzer may determine whether best practices are being followed and may give suggestions if they are not. As another example, a code analyzer may find a variable that is assigned but not used. The code analyzer may give a suggestion that the variable and assignment be removed.

8. Mutations. Mutation data includes information that indicates how changing variables in one method may affect other methods. For example, mutation data may include information that indicates what other methods change variables that a method uses or depends on. This mutation data may be referred to as upstream mutation data. As another example, mutation data may include information that indicates what variables a method modifies that other methods consume. This mutation data may be referred to as downstream mutation data.

9. Tests and Test Coverage. This data may indicate the number of tests that test code and what portion of the code is covered by the tests. This data may indicate information about code that resides in a block, function, file, project, more than one of the above, a combination of the above, and the like.

10. Tasks. This data may include information about tasks that a developer is supposed to do and whether displayed code is related to the tasks.

11. Coupling. This data may indicate what classes or methods are closely coupled with other classes or methods. Being closely coupled may be determined via a heuristic.

12. Clones. This data may indicate the presence of code that is similar to the displayed code.

Dynamic information may include, for example:

1. Run time. This data indicates how long it takes for the code to be executed. This data may be used to determine performance.

2. Call rate. This data indicates the hotness/coldness of the code. Hot code is called frequently relative to code that is not hot. Similarly cold code is called less frequently relative to code that is not cold.

3. Memory usage. This data indicates the amount of memory used by code.

Change history may include, for example:

1. Authors. This data indicates authors who change code. In one implementation, the data may include information that indicates the relative frequency with which the authors change the code and may be used to order the authors from the one who most frequently changes the code to the one who least frequently changes the code. In another implementation, this data may include information that indicates the last author who changed the code. In another implementation, this data may include information that indicates the author who predominantly changes the code.

2. Consumers. This data indicates software developers who write code that uses the displayed code.

3. Co-change. This data indicate methods that are changed at the same time as the method displayed. For example, a software developer may frequently or always change other methods when a certain method is changed.

4. Change history. This data includes information that indicates that changes that have occurred to the code over time.

5. Checkout history. In one implementation, this data may include information that indicates if anyone currently has the code checked out. In another implementation, this data may include information that indicates whether anyone else has changed the code since it has been checked out.

Analytics information may include, for example:

1. Cost. Cloud services may bill consumers of services for use of the services. This data may include information about the cost of using the code.

2. I/O. This data may indicate the amount of data that the code reads and writes when it executes.

3. Bandwidth. This data may indicate that amount of bandwidth the code consumes when it executes.

4. Database usage. This data may indicate the amount of database usage that the code uses.

Again it is noted that the examples above are not intended to be all-inclusive or exhaustive of the types of information that may be stored about code.

Turning to FIG. 2, an exemplary software development system is illustrated in accordance with aspects of the subject matter described herein. The software development system 205 may include development components 210, a display 215, a communications mechanism 220, and other components (not shown). The development components 210 may include a source code editor 225, a fetching manager 230, an action tag manager 235, a configuration manager 240, and other components (not shown).

The communications mechanism 220 allows components of the software development system 205 to communicate with other components outside the software development system 205. For example, the communications mechanism 220 may allow communication with the code information service 110 of FIG. 1. The communications mechanism 440 may be a network interface or adapter, modem, or any other mechanism for establishing communications.

The display 215 is an output device that can be used to display data in a visual manner. The display may implement or be part of a graphical interface by which a software developer can view code and information about the code. A graphical interface may display text, icons, controls, other graphical elements, and the like.

The source code editor 225 may operate to receive editing instructions related to code. The source code editor 225 may display code and other data as shown in examples illustrated in FIGS. 3-7.

The fetching manager 230 may be responsible to obtain information about code from a code information service. For efficiency, the fetching manager 230 may obtain information corresponding to multiple tags by sending a single request. In one embodiment, fetching may occur for all code currently shown on a display. In another embodiment, fetching may occur for all code in an entire file or other scope.

The action tag manager 235 may be operable to determine actionable tags to render on the display 215. The actionable tags represent information about the code (e.g., fetched by the fetching manage 230). Each actionable tag may be rendered on the display 215 so that it is in close proximity to the code with which the actionable tag is associated. For example, actionable tags for a function may be rendered slightly above the function while actionable tags for lines of code may be rendered in a margin.

The action tag manager 235 may also be responsible for causing more detailed information to be displayed about the code in response to user interaction. For example, the action tag manager may receive a message that indicate than an action tag is being interacted with (e.g., a user is hovering a mouse pointer over the tag, clicking on the tag, or the like), and in response may cause more detailed information about the action tag to be rendered on the display 215.

The action tag manager 235 may receive a message that indicates that action tags are to be rendered more prominently. In response, the action tag manager 235 may cause action tags to be highlighted in rendering the action tags on the display. Highlighting may include increasing the font size, changing the font color, changing background colors, inverting the foreground color with the background color, underlining a tag, causing a tag to blink, or doing some other action that draws attention to the tag.

The action tag manager 235 may receive a message that indicates that a temporary mode is to be entered into. In response, the action tag manager 235 may modify tags that are in the margin so that each tag focuses on the same information and indicates contribution from the line. For example, for program execution statistics, the information displayed for each line may indicate how long the line of code takes to execute.

The configuration manager 240 may receive input that indicates which of the actionable tags to render on the display 215. The configuration manager 240 may also receive input that indicates an order in which the actionable tags are to be rendered.

FIGS. 4-7 are block diagrams of additional exemplary user interface windows in accordance with aspects of the subject matter described herein.

Figure 4:
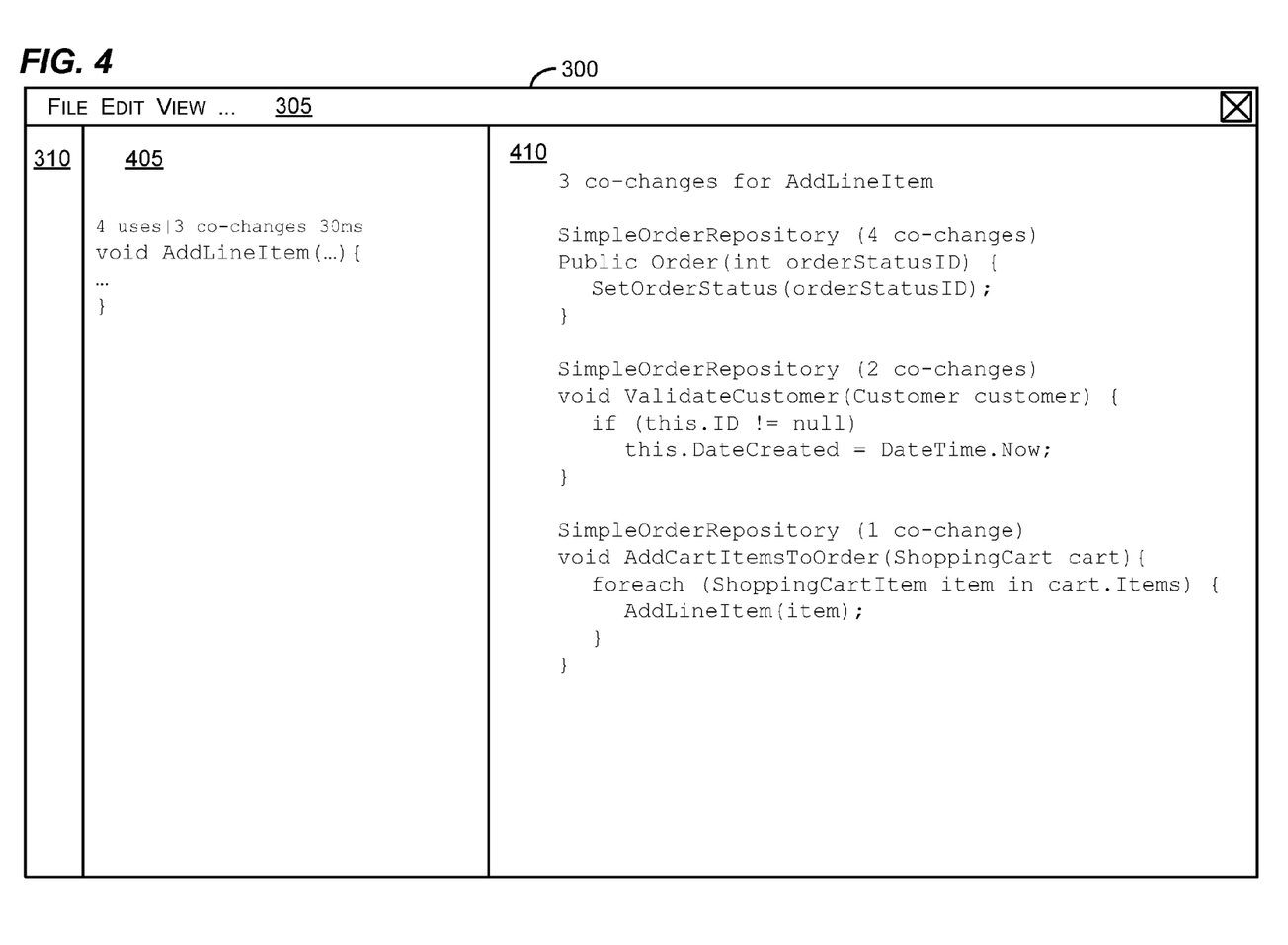
FIGS. 4-7 are block diagrams of additional exemplary user interface windows in accordance with aspects of the subject matter described herein.

Turning to FIG. 4, the pane 405 shows a function that has 3 co-changes. Clicking on or otherwise interacting with the co-changes action tag causes the pane 410 to be displayed which indicates 3 functions that are often changed at the same time as the function in the pane 405.

Figure 5:
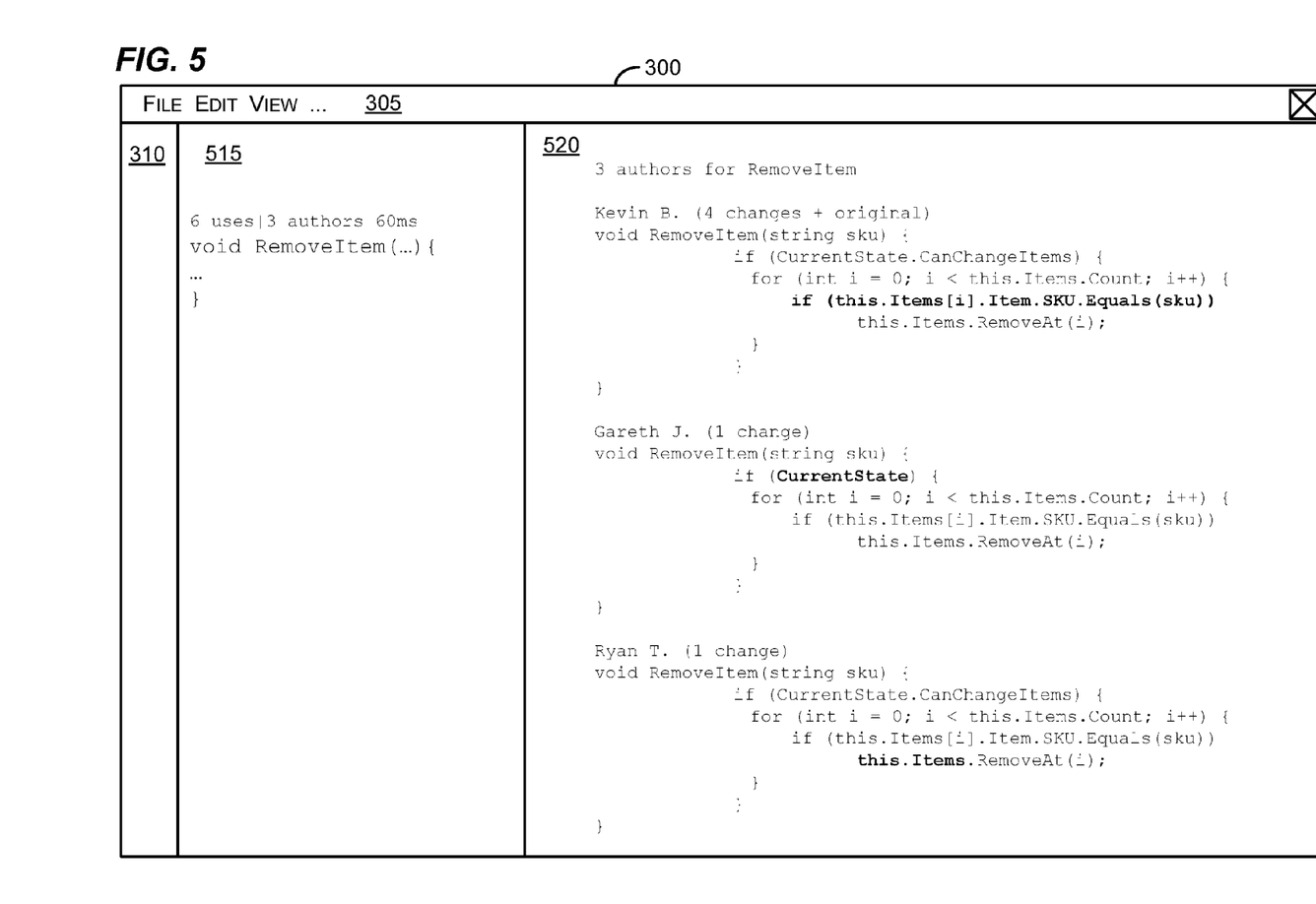

Turning to FIG. 5, the pane 515 shows a function that has 3 authors. Clicking on or otherwise interacting with the authors action tag causes the pane 520 to be displayed. The pane 520 may show who has modified the function and may highlight the modifications made.

Figure 6:
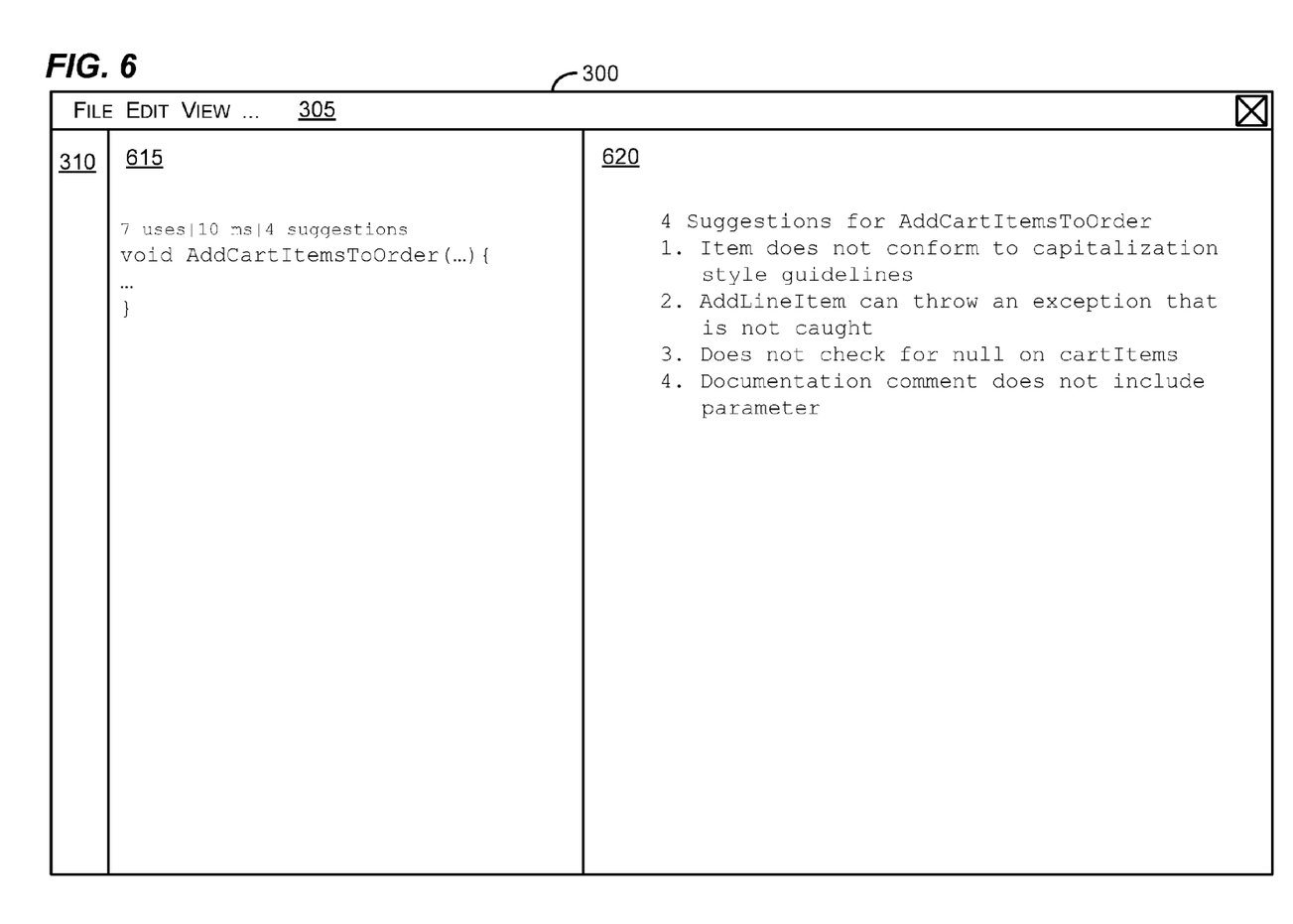

Turning to FIG. 6, the pane 615 shows a function that is associated with 4 coding suggestions. Clicking on or otherwise interacting with the suggestions action tag causes the pane 620 to be displayed. The pane 620 may show the suggestions and, where appropriate, allow the software developer to click on the suggestion to cause the suggestion to be implemented.

Figure 7:
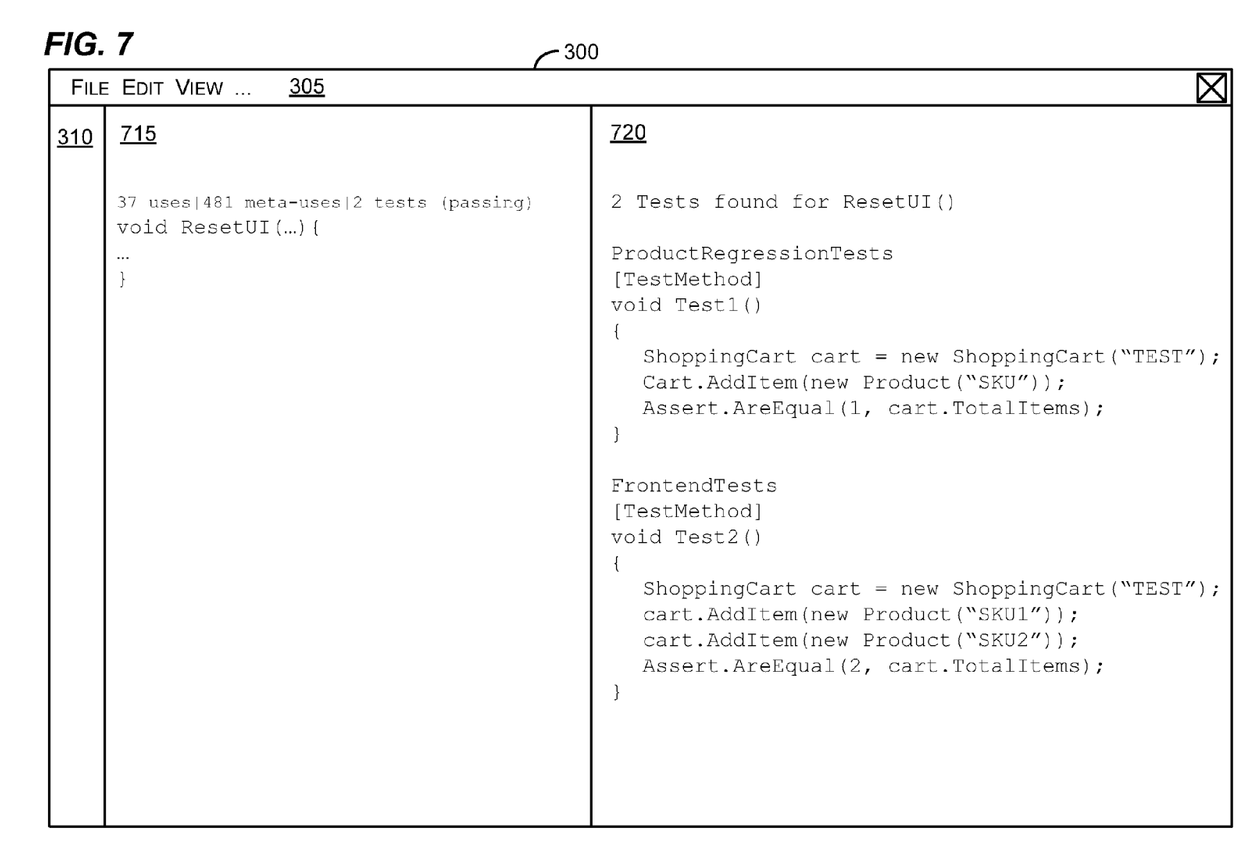

Turning to FIG. 7, the pane 715 shows a function that is associated with two tests. Clicking on or otherwise interacting with the tests tag causes the pane 720 to be displayed. The pane 720 may show code for the two tests. Although not shown, each test may have action tags associated with it that indicate, for example, how many functions are covered by the test, how many functions are meta-covered by the test, how long it takes to execute the test, whether the test is passing or failing, other information, and the like.

A format similar to that illustrated in FIGS. 3-7 may be used to show detailed information for other action tags.

Figure 8:
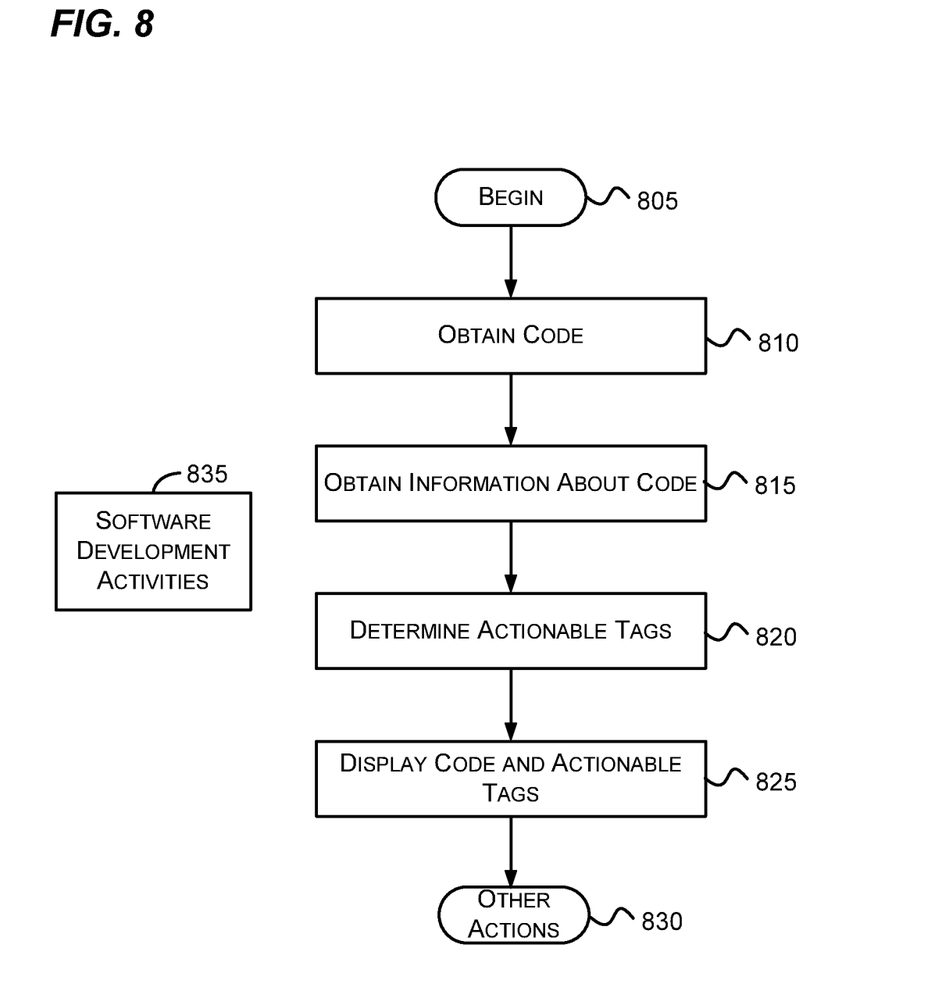
FIG. 8 is a flow diagram that generally represents exemplary actions that may occur in accordance with aspects of the subject matter described herein.

FIG. 8 is a flow diagram that generally represents exemplary actions that may occur in accordance with aspects of the subject matter described herein. For simplicity of explanation, the methodology described in conjunction with FIG. 8 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

Turning to FIG. 8, at block 805, the actions begin.

At block 810, code is obtained. For example, referring to FIG. 2. The source code editor 225 may obtain code from a code repository.

At block 815, information about the code is obtained. For example, referring to FIGS. 1 and 2, the fetching manager 230 may obtain information about the code from the code information service 110.

At block 820, actionable tags to display are determined. The actionable tags indicate additional data about the code. The actionable tags are associated with portions (e.g., lines, functions, classes, variables, files) of the code. When activated, the actionable tags cause a software development environment to display additional information about the code.

At block 825, the code and actionable tags are displayed. For example, referring to FIG. 2, source code that follows the syntax of a programming language may be displayed in close proximity to actionable tags on the display 215. Examples of displaying code and actionable tags are illustrated in FIGS. 3-7.

At block 830, other actions, if any, are performed.

Software development activities may be performed asynchronously to performing the actions 810-825. This is illustrated by block 835. For example, a software developer may continue modifying, debugging, and navigating through code without being required to wait while analysis is performed on the code. Furthermore, tags may be updated or added while the software developer is performing a software development activity.

In one embodiment, performing the actions associated with the actionable tags asynchronously with the software development activities may involve performing the actions independently of each other in such a way that the actions do not wait for each other. In one implementation, this may be performed by using two threads that are not blocked by each other.

As can be seen from the foregoing detailed description, aspects have been described related to software development. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

displaying at least one line of source code on a graphical interface of a software development environment that is operable to receive input for software development activities;

receiving an instruction for a software development activity from a user; and performing actions asynchronously to receiving the instruction for the software development activity from the user, the actions, comprising:

obtaining information about the at least one line of source code, the information derived from one or more analyses of the at least one line of source code performed at a different point of time;

determining one or more actionable tags to display on the graphical interface, the one or more actionable tags represent the obtained information;

in proximity to the code, displaying the actionable tags on the graphical interface; and in response to detecting activation of an actionable tag from the user, displaying the information associated with the activated actionable tag.

2. The method of claim 1, the actions further comprising: obtaining the information about the at least one line of source code from at least one remote service.

3. The method of claim 1, wherein receiving an instruction for a software development activity comprises receiving an instruction to modify the source code.

4. The method of claim 1, wherein the information derived from the one or more analyses of the at least one line of source code includes static information associated with one or more of calls, meta-calls, overrides, interfaces, code complexity, bugs filed, code analysis suggestions, mutations, test, coupling of methods and classes, or clone data.

5. The method of claim 1, wherein performing actions asynchronously to receiving the instruction comprises performing the actions by a first thread that is not blocked while a second thread receives and acts upon the instruction.

6. The method of claim 1, wherein displaying the actionable tags on the graphical interface comprises displaying the actionable tags adjacent to lines of the source code.

7. The method of claim 1, wherein displaying the actionable tags on the graphical interface comprises displaying the actionable tags above one or more of a class, method, and variable.

8. The method of claim 1, further comprising displaying the information during hovering input received via the software development environment.

9. The method of claim 1, further comprising visually highlighting a change that has occurred for data corresponding to at least one of the actionable tags.

10. The method of claim 9, wherein visually highlighting a change that has occurred for at least one of the actionable tags comprises displaying highlighted text if the information about the at least one line of source code indicates that execution time for the at least one line of source code has changed.

11. The method of claim 1, wherein obtaining information about the at least one line of source code comprises, in a single request, obtaining information for all source code that is currently displayed on the graphical interface.

12. In a computing environment, a system, comprising:
at least one processor; and
a software development environment operable to receive input for software development activities from a user, the software development environment including:
a display operable to render text associated with code of a software program,
a source code editor operable to receive editing instructions related to the code from the user,
a fetching manager operable to obtain information about the code, the information derived from one or more analyses of the code performed at different points of time, the one or more analyses performed statically or dynamically, and
an action tag manager operable to determine actionable tags to render on the display, the actionable tags representing the obtained information about the code, the action tag manager further operable to cause the actionable tags to be rendered on the display so that each actionable tag is rendered in proximity to a portion of the code with which the actionable tag is associated, and in response to detecting activation of an actionable tag by the user, displaying the information associated with the activated actionable tag,
wherein the fetching manager and the action tag manager operate asynchronously with the source code editor.

13. The system of claim 12, further comprising one or more information providers operable to generate the information asynchronously from the software development activities.

14. The system of claim 13, further comprising a code information service, the code information service operable to obtain the information about the code from the one or more information providers and to provide the information about the code to the fetching manager.

15. The system of claim 14, wherein the code information service is operable to maintain snapshots about the code, each snapshot corresponding to information that existed about the code at a time corresponding to the snapshot.

16. The system of claim 12, further comprising a configuration manager operable to receive input that indicates which of the actionable tags to render on the display, the configuration manager further operable to receive input that indicates an order in which the actionable tags are to be rendered.

17. The system of claim 12, wherein the action tag manager is further operable to receive a message that indicates that an action tag is being interacted with, and in response, to cause more detailed information about the action tag to be rendered on the display.

18. The system of claim 12, wherein the action tag manager is further operable to receive a message that indicates that the action tags are to be rendered more prominently and in response to cause the action tags to be highlighted in rendering the action tags on the display.

19. In a computer system having at least one processor, the system comprising:
a graphical user interface displayed on a display device;
a first area in which code of a software program is rendered on the display device; and
a second area in which actionable tags about the code are rendered on the display device, the actionable tags indicating additional data about the code, the additional data obtained and displayed asynchronously to software development activities that occur within the first area, the actionable tags, when activated by the user, causing a software development environment to display the additional data about the code in a third area, the first, second, and third areas adjacent to each other, the additional data derived from one or more analyses of the code performed at different points of time, the one or more analyses performed statically or dynamically.

20. The graphical user interface of claim 19, wherein the actionable tags are rendered in a smaller font size and in a different color than a font size and color used to render text that represents the code.

* * * * *